United States Patent [19]

Beaver

[11] Patent Number: 5,528,425
[45] Date of Patent: Jun. 18, 1996

[54] APPARATUS AND METHOD FOR CREATING OPTICAL ILLUSION EFFECTS

[75] Inventor: Robert T. Beaver, Raleigh, N.C.

[73] Assignee: Design Magic, Inc., Raleigh, N.C.

[21] Appl. No.: 132,379

[22] Filed: Oct. 6, 1993

[51] Int. Cl.⁶ .......................... G02B 27/14; G03B 21/32
[52] U.S. Cl. .......................... 359/629; 352/85; 359/478
[58] Field of Search ................... 352/88, 89, 90, 352/85; 359/629, 630, 449, 460, 443, 478; 353/10, 30

[56] References Cited

U.S. PATENT DOCUMENTS

| | | |
|---|---|---|
| 570,255 | 10/1896 | Kerner . |
| 663,267 | 12/1900 | Fitch . |
| 1,166,701 | 1/1916 | Mansfield . |
| 1,456,233 | 5/1923 | Hammond et al. . |
| 1,636,112 | 7/1927 | Schufftan ............................ 352/89 |
| 1,636,834 | 7/1927 | Peters et al. . |
| 1,775,237 | 9/1930 | Dawley et al. . |
| 2,054,414 | 9/1936 | Fleischer ............................ 88/16 |
| 2,310,339 | 2/1943 | Arndt ................................. 352/89 |
| 2,336,508 | 12/1943 | Smith et al. ........................ 88/24 |
| 2,402,822 | 6/1946 | Kraft .................................. 88/16 |
| 2,727,427 | 12/1955 | Jenkins .............................. 352/89 |
| 2,727,429 | 12/1955 | Jenkins .............................. 88/16 |
| 2,857,806 | 10/1958 | Schnfftan .......................... 352/89 |
| 2,861,806 | 11/1958 | Disney .............................. 272/18 |
| 2,934,601 | 4/1960 | Oppenheimer .................... 178/6.8 |
| 2,952,182 | 9/1960 | Marks et al. ...................... 88/16.6 |
| 3,006,241 | 10/1961 | Marks et al. ...................... 88/16.6 |
| 3,180,211 | 4/1965 | Armstrong ........................ 88/24 |
| 3,182,547 | 5/1965 | Armstrong ........................ 88/24 |
| 3,366,438 | 1/1968 | Hartman ............................ 352/89 |
| 3,493,290 | 2/1970 | Traub ................................ 350/174 |
| 3,506,351 | 4/1970 | Geitz ................................. 355/43 |
| 3,515,454 | 6/1970 | Paganelli .......................... 350/137 |
| 3,551,043 | 12/1970 | Neuberger ........................ 353/37 |
| 3,655,272 | 4/1972 | Valadez ............................. 352/88 |
| 4,190,856 | 2/1980 | Ricks ................................ 358/88 |
| 4,303,316 | 12/1981 | McElveen ........................ 352/57 |
| 4,306,768 | 12/1981 | Egging ............................. 350/174 |
| 4,736,214 | 4/1988 | Rogers ............................. 353/10 |
| 4,747,665 | 5/1988 | O'Brien ............................ 350/144 |
| 4,805,895 | 2/1989 | Rogers ............................. 272/10 |
| 4,974,957 | 12/1990 | Kaelin .............................. 353/10 |
| 5,024,521 | 6/1991 | Zuchowski et al. ............... 352/86 |
| 5,052,797 | 10/1991 | Madsen ............................ 353/28 |
| 5,061,061 | 10/1991 | Robley et al. .................... 352/89 |
| 5,255,028 | 10/1993 | Biles ................................ 353/7 |
| 5,329,323 | 7/1994 | Biles ................................ 359/449 |

*Primary Examiner*—Paul M. Dzierzynski
*Assistant Examiner*—Darren E. Schuberg
*Attorney, Agent, or Firm*—Olive & Olive

[57] ABSTRACT

An apparatus for providing optical illusion effects, which includes a first projection screen; an area from which persons may view the first projection screen; a stage area between the viewing area and the first projection screen; an illumination system for the stage area so that objects on the stage may be illuminated at a desired light level without directly illuminating the first screen; an inclined, partially silvered mirror between the viewing area and the stage area; a second projection screen positioned in a second plane at a first angle to the first plane, wherein the inclined mirror is positioned between the first and second planes; a first projector for projecting images on the first projection screen so that images on the first projection screen may be seen by viewers in the viewing area; a second projector for projecting images on the second projection screen so that images on the second projection screen are visible to the viewers by means of reflection from the mirror and appear to be located at a selected location; and a component for changing between images from the projector so that viewers may be presented an image from either or both projector at any one time. Methods of using the apparatus include providing the optical illusion of having characters and objects merge interactively with projected images.

7 Claims, 5 Drawing Sheets

APPARATUS AND METHOD FOR CREATING OPTICAL ILLUSION EFFECTS

BACKGROUND OF THE INVENTION

1. Field of the Invention

This invention relates to an apparatus and methods for creating visual illusion effects, and more particularly for creating stage effects in a theater setting.

2. Description of the Related Art

Persons who have been involved in attempts to create visual illusions in the live stage productions of plays or other performances have utilized numerous types of devices to create a diversity of visual illusions. Of particular interest are illusions created by visibly merging actors or objects on a stage with a motion picture film to the degree that the observer cannot distinguish between the film and the stage and cannot tell where the boundary is.

One technique which has been used involves use of a slit screen. An actor walks on the stage through a flexible slit in a screen on which a motion is being presented. This technique is difficult to make appear realistic because the audience can generally see the slit itself and understand what has actually happened even though various efforts have been made to mask the slit visually, for example, with lights. Thus, despite use of techniques to minimize the visibility of the slit, it remains visible to anyone who sees it done more than once, and there is not a seamless merger of the real object and the projected image.

Also of interest are illusions in which a performer appears to be altered or hidden from view while being actually present on the stage. The basic invisibility effect can be achieved by any half-silvered mirror room or box with neutral or regularly patterned background. An early technique known as "Pepper's Ghost" was developed in the nineteenth century and is used in certain illusions of a haunted house. This technique uses an angled piece of glass between the audience and a stage surface. A ghost figure located off-stage where it is not visible from the audience is illuminated with bright lights so that the image of the ghost figure is reflected as a transparent image off the glass. Because of the angle and position of the glass, the transparent ghostly image of the ghost figure appears to be on stage with the "real" characters. Thus, using this technique an object may appear to be more or less transparent, but it does not ever appear completely solid.

Another method of making a character present on the stage seem to disappear, termed "metempsychosis", utilizes a mirror having variations across its surface in the amount it is silvered. For example, lines are scribed in the silvering on a standard mirror, beginning with spread-out and/or thin lines and gradually increasing the thickness of the lines and/or decreasing the spacing between the scribed lines until there is an area of plain glass from which all of the silvering has been removed. The piece of variably silvered glass is placed in a grooved track at an angle across the stage. When the glass is moved back and forth in the track, a person on the stage behind the glass is visible when there is little silvering present between the person and the viewers, and is hidden when there is dense silvering present.

The illusion appliance of Hammond (U.S. Pat. No. 1,456,233) utilizes a transparent glass mounted on an inclined plane, a translucent screen having a scene on it and positioned above the glass and reflected on it, and a second translucent screen upon which a moving picture may be projected. The moving picture appears to take place on the scene reflected in the glass.

Other methods have involved partially silvered mirrors, which are typically made by spattering, or otherwise applying silver to a glass so that a portion of incident light is reflected and a portion of the light passes through the glass depending on the extent of silvering. The patent of Rogers (U.S. Pat. No. 4,805,895) is for an image forming apparatus and method where there are no image forming surfaces. A false ceiling separates a motion picture projector and rear view projection screen from the audience viewing area. A semi-transmissive reflecting member is disposed at an angle of 13.5 to 31 degrees to a vertical plane in front of the line of sight of the viewing audience.

The Rogers patent also provides a summary of three prior "Blue Room Techniques" utilizing partially silvered mirrors. In the traditional Blue Room the mirror is vertical but at a 45° angle to a plane normal to the axis of a central observer's line of sight to a stage. The real object is in the wings of the theater. In Disney's Haunted Mansion Configuration (essentially the same as Pepper's Ghost discussed above), a large percentage silvered mirror is placed vertically at a 90° angle to a plane normal to the axis of a central observer's line of sight to the stage. The real objects are placed either above or below the audience area. In the Sideways Blue Room, the traditional Blue Room setup is rotated 90° around the axis of the central observer's line of sight.

It is therefore an object of this invention to provide an apparatus and method for providing optical illusion effects, including the illusion that an object or character on a stage has disappeared, or is in a selected position on a stage.

It is a further object of this invention to provide an apparatus and method which utilizes invisibility to achieve merger of stage and screen images through coordination of the degree of transparency of the stage object with the appearance and disappearance of screen images.

Other objects and advantages will be more fully apparent from the following disclosure and appended claims.

SUMMARY OF THE INVENTION

The invention herein is an apparatus and method for providing optical illusion effects. The apparatus includes a first projection screen having a front viewing side and being positioned in a first plane; a viewing area from which persons may view said first projection screen; a stage area between said viewing area and said first projection screen; an illumination system for said stage area so that objects on said stage may be illuminated at a desired light level without illuminating said first screen at the same level; an inclined, partially silvered mirror between said viewing area and said stage area; a second projection screen positioned in a second plane at a first angle to said first plane, wherein said inclined mirror is positioned between said first and second planes; a first projection means for projecting images on said first projection screen so that images on said first projection screen may be seen by viewers in said viewing area; a second projection means for projecting images on said second projection screen so that images on said second projection screen are visible to said viewers by means of reflection from said mirror and appear to be located at a selected location; and a means of changing between images from said projection means so that viewers may be presented an image from either or both projection means at any one time.

The invention further provides a method of achieving visual merger of stage and screen images, by providing a moving picture which appears to be on the projection screen, utilizing one of said projection means. Objects and persons on the stage may be made to appear to change between being in the moving picture and not being in the moving picture, through coordination of the degree of transparency of the stage object with the appearance and disappearance of screen images, by selectively utilizing the projection means and lighting means.

The invention may be utilized for entertainment performances, educational and other displays and interactive productions. Methods of using the apparatus include providing the optical illusion of having characters and objects appear to move from the stage into the screen and vice-versa, allowing interactions between the screen and stage, and having a character or object on the stage disappear, or having added objects or characters at selected locations.

Other aspects and features of the invention will be more fully apparent from the following disclosure and appended claims.

DETAILED DESCRIPTION OF THE INVENTION AND PREFERRED EMBODIMENTS THEREOF

The present invention in its first embodiment comprises an apparatus for providing optical illusion effects, comprising:

(a) a first projection screen 20 having a front viewing side 22 and being positioned in a first plane 24;

(b) a viewing area 26 from which persons may view said first projection screen 20;

(c) a stage area 28 between said viewing area 26 and said first projection screen 20;

(d) an illumination system 30 for said stage area 28 so that objects on said stage are 28 may be illuminated at a desired light level without directly illuminating said first projection screen 20;

(e) an inclined, partially silvered mirror 32 between said viewing area 26 and said stage area 28, said mirror 32 being inclined upward away from the viewing area 26;

(f) a second projection screen 34 positioned in a second plane 36 at a first angle α to said first plane 24, wherein said inclined mirror 32 is positioned between said first and second planes;

(g) a first projection means 38 for projecting images on said first projection screen 20 so that images on said first projection screen 20 may be seen by viewers in said viewing area 26;

(h) a second projection means 40 for projecting images on said second projection screen 34 so that images on said second projection screen 34 are visible to said viewers by means of reflection from said mirror 32 and appear to be located at a selected location; and (i) a source of video images for the projection means and a switching means 42 for changing between images from said projection means 38, 40 so that viewers may be presented an image from either or both projection means at any one time.

The invention preferably utilizes a partially silvered mirror, for example, a half-silvered mirror between the viewing area and the screen as mirror 32. For a full life-size stage, the size of mirror 32 is preferably at least about 2×3 feet for partial views of an actor or views of a small object, to 4 ×6 feet for more substantial views. Preferably mirror 32 is at least about 7×12 feet in size so that an actor on the stage behind mirror 32 is not visible to the audience except through mirror 32 when appropriate lighting is used. Larger pieces of course, while being more expensive, and difficult to install, provide the capability of a larger stage area 28 upon which illusions may be provided according to the method of the invention. Thus, any mirror 32 which is of a technologically feasible size may be used.

Figure 5:
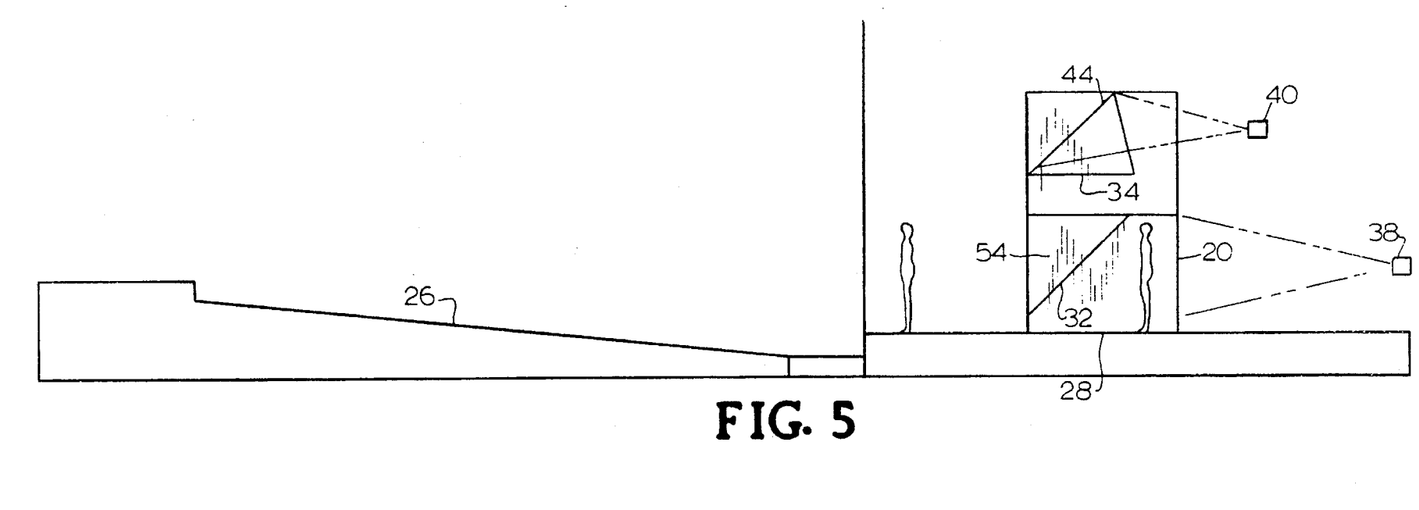
FIG. 5 is a schematic diagram of a side view of the apparatus according to the invention.
Figure 6:
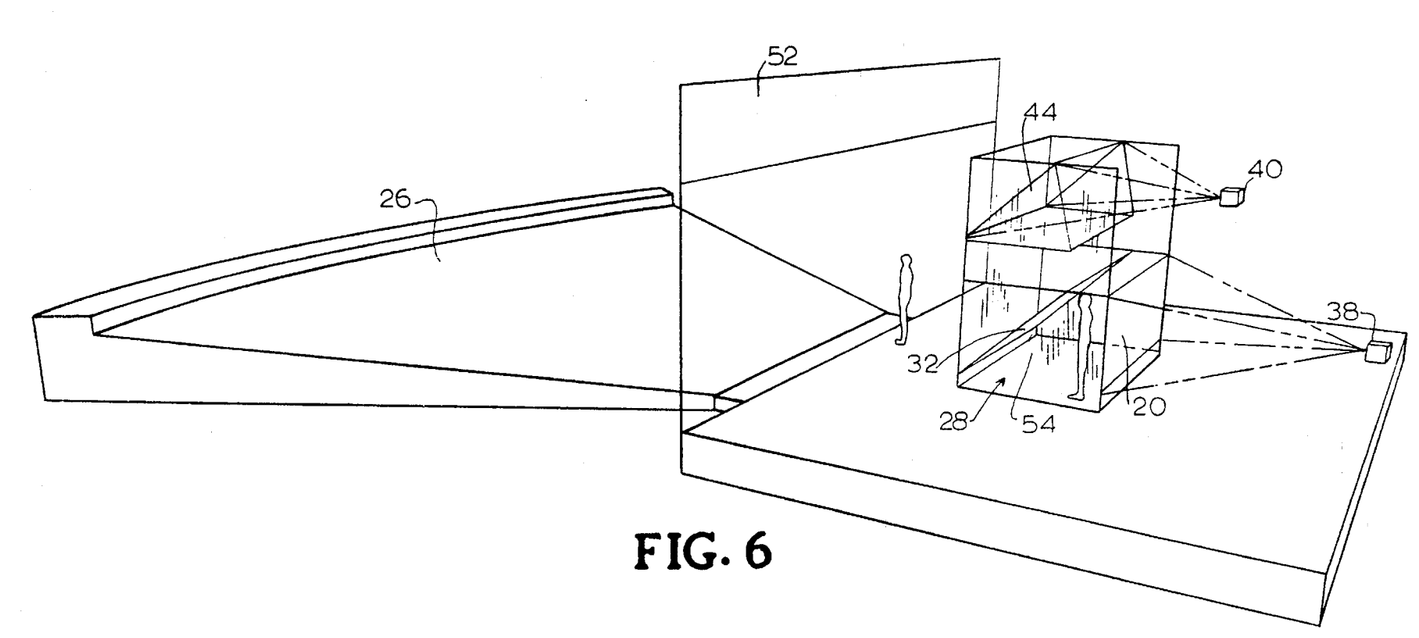
FIG. 6 is a schematic perspective diagram of the apparatus according to the invention.

Preferably, there are opaque side pieces 54 as shown in FIGS. 5 and 6 on each side of mirror 32. The side pieces 54 both serve as supports for mirror 32 as well as disguising the fact that there is a mirror present by hiding the side edges of mirror 32. Alternatively, scenery pieces may be positioned at the edges of mirror 32 to serve the same purpose. If there are no side pieces 54 or substitutes therefor, extra care needs to be taken with respect to placement of the audience and the actors or objects behind mirror 32 so that a portion of the audience does not see more than is desired.

The first projection screen 20 preferably is the size of all or substantially all of the entire rear wall of the stage area 28, however, smaller areas may be selectively covered, particularly if the area in which illusions are to be provided does not comprise the entire stage area 28.

As shown in FIGS. 1–3 and 5–6, the second projection screen 34 is preferably positioned above the stage area 28. For projection of an illusory image that appears to be on the first projection screen 20, the second projection screen 34 is located at the same angle α to the inclined, partially silvered mirror 32 as is the first projection screen 20. Although angle α is preferably 45 degrees and the two projection screens are preferably at a 90-degree angle to each other, other arrangements may be used. The main requirement is that the first projection screen is visible to the audience, and the image from the second projection means may be projected on mirror 32 so that it appears to the audience to be in the location desired for the particular optical effect. Additional projection screens may be added to increase the diversity and complexity of the visual presentations and illusions.

Figure 1:
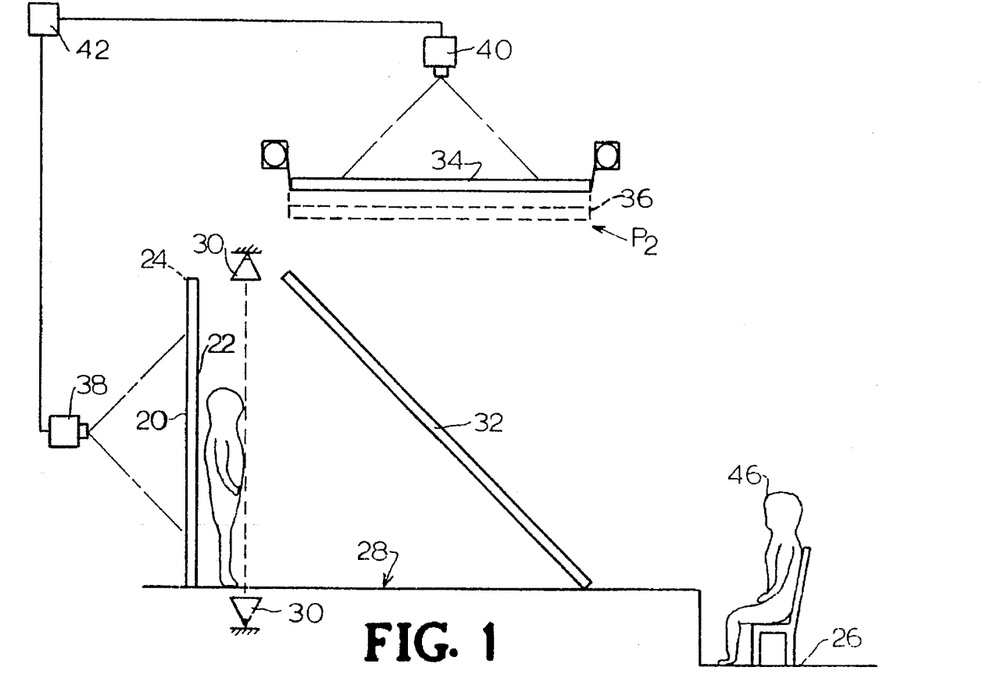
FIG. 1 is a schematic diagram of an apparatus according to the invention utilizing one partially silvered mirror and showing how the location of a second projection screen may be changed.
Figure 2:
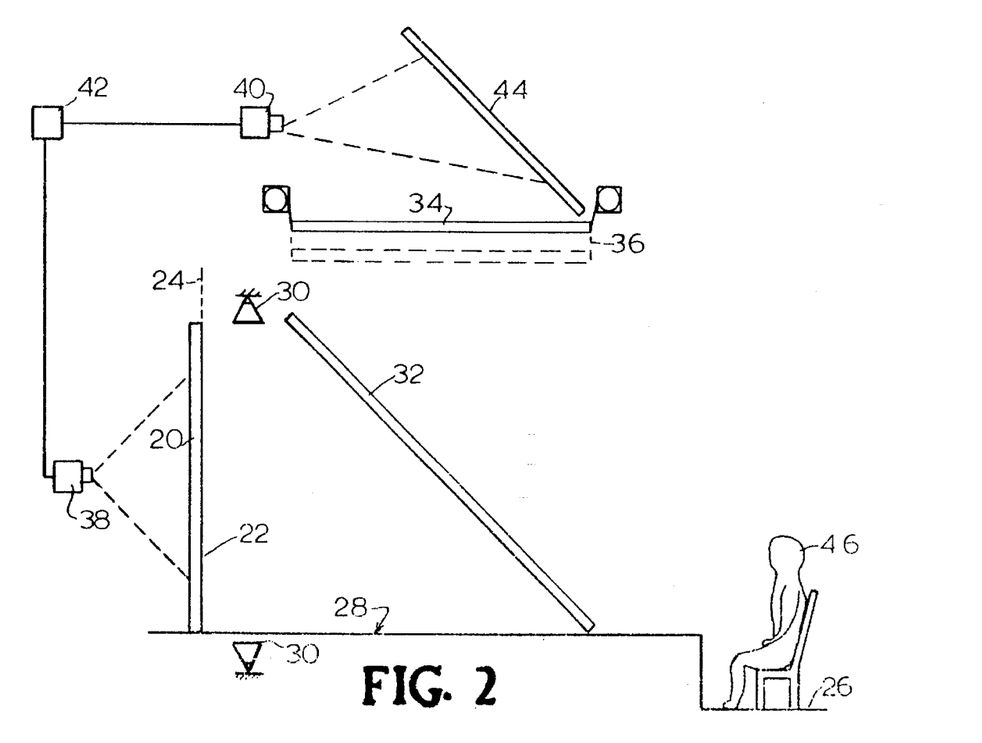
FIG. 2 is a schematic diagram of an apparatus according to the invention utilizing one partially silvered mirror and a fully silvered mirror.

The image is projected on to the second projection screen 34, either directly as shown in FIG. 1 by rear projection with a video projector in which the image is electrically reversed, or by projection of the image on a fully silvered mirror 44 inclined as shown in FIGS. 2 and 5–6 and at the same angle as the partially silvered mirror 32. Either of these techniques allows the same background as is being shown by the first projection means 38 to appear to be shown on the first projection screen 20 by the second projection means 40 which allows the method of the invention of making an object or person disappear. Thus, when the first projection means shows a picture, a viewer 46 in the viewing area 26 sees the actual projected images through the partially silvered mirror 32 on the first projection screen 20. When the two projection screens are equidistant from, and at the same angle to, the inclined mirror 32, and the second projection means 40 shows a picture on the second projection screen 34, the image is really reflected in the partially silvered mirror 32, but because of the angles and distances between the screens and mirror, appears to a viewer to be on the first projection screen 20. The projection screen which is not in use is preferably darkened to create either a solid image (use of rear screen and side lighting) or make the image vanish completely (use of top screen only). The use of both screens creates a transparent object on the stage as opposed to a solid object or to the object apparently vanishing. To the extent the angle at which the partially silvered mirror 32 is hung or positioned creates mirror sag due to bending of the large sheet of glass, specially ground lenses may be used in the top projector to compensate optically for the sag.

The viewing area 26 is preferably shaped and of a size so that persons in the audience can see the images reflected in mirror 32 at the appropriate time, and also can see an actor or other selected object(s) through mirror 32, when the actor or object are positioned on the stage behind the mirror and appropriately illuminated. This means that the ideal shape for the viewing area is a fan shape as shown in FIG. 6. Thus, the audience members should be positioned so they cannot see the stage area behind mirror 32 except by seeing it through mirror 32.

Figure 3:
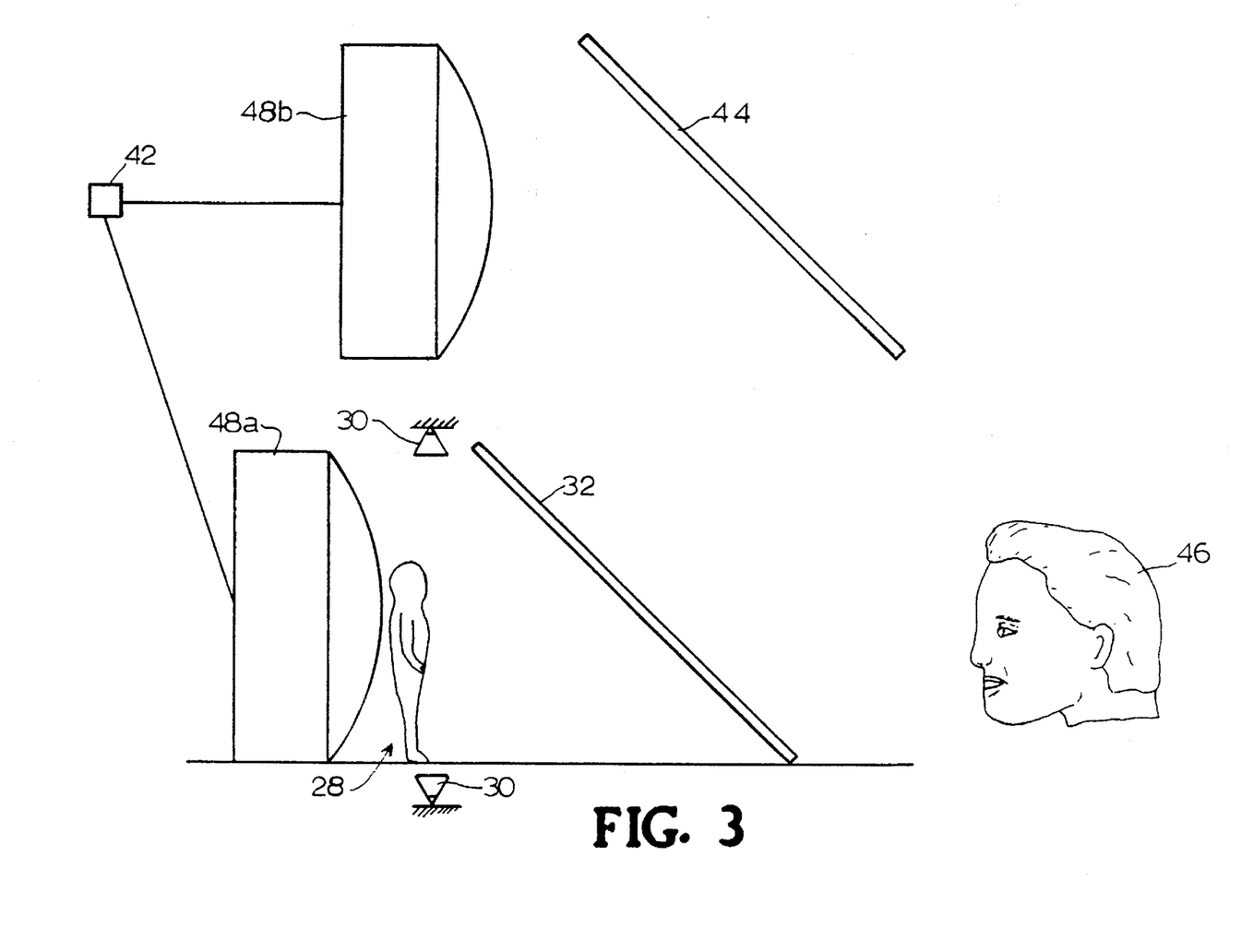
FIG. 3 is a schematic diagram of a small scale version of the apparatus using video monitors as the projection screens.

Substantially smaller mirror pieces than the large mirror 32 shown in the FIGS. 1 and 2 may be used for viewing of particular performances, for example, by puppets or smaller acting entities (FIG. 3). Monitor 48a is shown for convenience in FIG. 3 as being located beneath monitor 48b, closer to the viewer than is optically correct, and would be located substantially to the left of the position shown in FIG. 3. For such miniature systems where the partially silvered mirror 32 is of a substantially reduced size, each projection means may comprise a television monitor 48a, b. To provide the different images, a video switcher connected to a video source machine may be used, manually, or by computerized control, to play the selected video either on the first television monitor 48a, or on a second television monitor 48b positioned at the same relative position as the second projection screen 34 of the full-sized version of the invention. Thus, the video source provides an image to the selected monitor, which selection determines whether the image will actually be on the screen which is being viewed by the viewer(s) or will only appear to be on the screen (use of the second monitor and inclined partially silvered mirror). It is clear that in order for the image from the second monitor 48b to match the image from the first monitor 48a, an image reverser would be required if there is no fully silvered mirror 44. The source(s) of the video image(s) may be integrally included in the video switcher 42 or be one or more separate instruments which are connected to both projection means.

Lighting on the stage changes in conjunction with the switching between projection means. Thus, when the first projection means 20 is used, lighting from lights 30 placed at one or more of the sides (not shown), top and bottom areas directly illuminates characters and objects on the stage area 28, but preferably does not in any significant way illuminate the first projection screen 20 or cause light to fall on the first projection screen 20. When the second projection means 40 is used, the characters and objects which are not to be seen are not illuminated directly, and preferably there is little incident light illuminating these characters and objects. Use of low lighting on an object when the second projection screen 34 is used allows an object to be seen as "transparent" as the audience can see the object but can also see what appears to be the background behind the object. If only the second projection screen is used with a side-lit object or person on the stage, the stage object will be very thin and "ghostly". The use of the first projection screen at the same time with a low projection level yields a more defined but still transparent stage object. Thus, the method of the invention allows a wide range of imagery, and a greater sense of presence even for its "ghosts".

Utilizing selective lighting on particular objects or characters it is possible to have some of the characters or objects disappear and others remain, or to have some objects or characters partly disappear or partly be transparent, as the images switch from being displayed on the first projection screen 20 to those displayed on the second projection screen 34 which are seen by the viewers in mirror 32. Most preferably the area of the selective change is masked on both the first and second projected images to enhance the visual effect. Thus, an area of the image on the first screen, behind the object or character, must be blacked out in the making of the film or the tape or in the projecting of it. At the same time, everything on the second screen except the selected area must be blacked out so that there is an overlaid projection only in the selected area. This transition must be accompanied by a reduction of direct lighting on the selected object or character.

In order for the method of the invention to allow a person or object on the stage area 28 to seem to disappear, it is important that the components of the invention are properly aligned optically so that if the background is to remain the same whether or not the person is visible, the two images from the two projection means are completely identical in appearance and apparent position to the viewers.

If the components of the invention are arranged correctly, persons in the viewing area 26 are not actually aware that the partially silvered mirror is there. It is important therefore not to dispel this illusion by having bright lights in the viewing area which might be directly reflected off of the mirror surface, or, except as planned for particular events, to allow persons from the audience into the stage area. Also, appropriate curtains or baffles 52 need to be used to hide the second projection screen 34 from the audience.

The switching between projection means, and concomitant control of the lighting can be controlled manually for creation of simple disappearing acts or other illusions. For more complicated scenarios, however, it is preferred to provide a switching means 42 comprising computer control of the lighting and projectors as needed for the particular performance. Such switching involves alternately turning on one projector and turning off the other, while also turning lights on or off as described herein.

In a second preferred embodiment of the apparatus of the invention, the plane of one or both of the projection screens is movable. For example, in a preferred embodiment, the second projection screen 34 is movable to one or more planes parallel with the plane on which it is positioned in the first embodiment of the invention. As shown by the dotted lines parallel to the second projection screen 34 in FIG. 1, if the second projection screen 34 is lowered from the original second plane 36 to a lower plane $P_2$, the apparent screen upon which the viewers see the image is shifted forward to screen position $S_2$ (shown at an exaggerated distance from the first screen in FIG. 4 to allow for the standing person). Generally, unless other specific effects are desired, it is preferred that the appropriate projection means be moved the same direction and amount corresponding to any movement of a projection screen so that there is not an apparent change in size of the projected image.

The opposite effect of shifting the apparent screen position backward away from the viewers occurs if the second projection screen (and preferably the second projection means) is raised above the second plane 36. This illusion occurs even though what is actually being seen by the viewers 46 in all cases when the second projection means 40 is being utilized is on the partially silvered mirror 32 and has not changed locations. It is clear that similar movement of the first projection screen in parallel with the position shown in the Figures allows variation of the amount of space between mirror 32 and the first projection screen. The means of movement of one or both projection screens may be by any means known in the art, for example, a bar placed at each of the four corners of the projection screen(s) along which the appropriate screen may track to the selected position.

The movable projection screens may be motorized so that they can move automatically, using programmed control mechanisms in coordination with other visual effects. Thus, using the second projection screen 34 in a sequence of different positions allows creation of the illusion that the projected image is moving forward or backward as the second projection screen 34 is moved downward and upward, respectively. If this illusion is used, for example, in conjunction with an actual actor on the stage area 28, and in conjunction with the appropriate changes in lighting, a character who is part of the image projected with the second projection means 40 could be made to appear to move, for example, around in front of the actual actor on the stage area 28.

Figure 4:
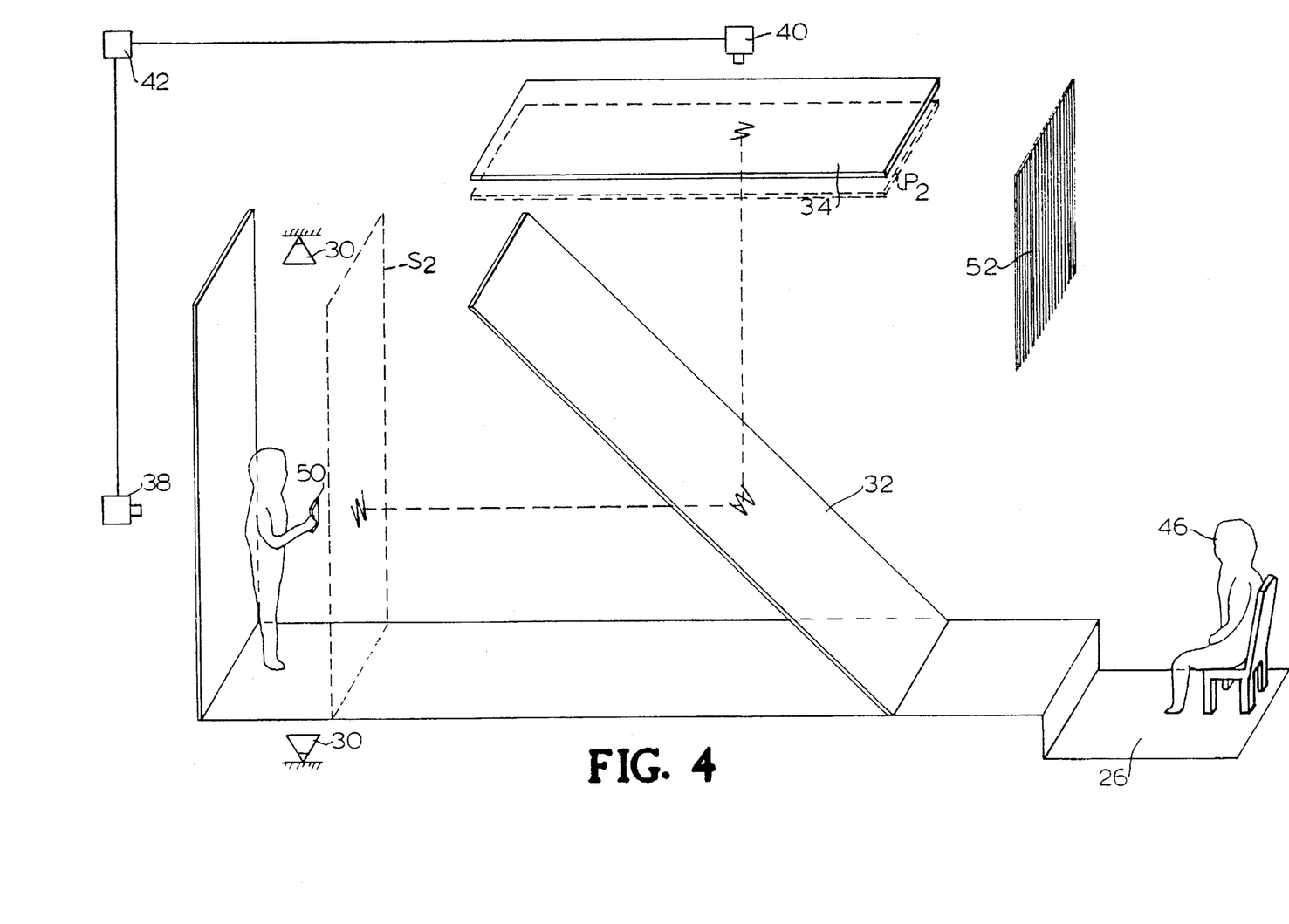
FIG. 4 shows how a position sensor may be used with the invention.

Another type of visual illusion may be created with the apparatus of the method if a position/orientation sensor such as the Polhemus tracker (Polhemus Labs, Cambridge, Vt.) is also used, for example on the hand of a character on the stage. As shown in FIG. 4, if the character points a name or word in the air by moving the hand appropriately to which the sensor 50 is attached, information from the sensor 50 can be fed back to a standard computer control mechanism so that the word the character writes will appear on the second projection screen 34. The location of the second projection screen 34 determines where what is being written will appear to be with respect to the location of the character, for example, in front of or behind the character. Thus, the character may appear to be writing in a plane which is between the first projection screen and the viewing area. Use of this embodiment of the method of the invention would be extremely difficult to do by choreographing the movement of the actor's hand to an image in three-dimensional space because the actor cannot see the image and extremely close registration of the image and movement would be required for the effect to be realistic. Thus, the position sensor allows the actor's movement to be exactly synchronous with the image seen by the viewers.

In another example of use of a position sensor 50 with the invention, a character in the stage area 28 could draw the outline of a person in an area defined by where the second projection screen appeared to place the outline, for example directly in front of the character. Using computer graphics the animated picture of a person could appear within the outline drawn by the character. If the real person depicted within the outline were actually present on the stage but had been previously invisible to the viewers 46 using the method of the invention described above, the real person could then be made to become visible to the viewers and to "walk out of" the outline and be on the stage.

Other possible variations on the invention herein include use of interactive video as the image being projected on to the screens. Thus, what the character(s) are doing on the stage interacts with the screen image, and the script for the program preferably incorporates the optical illusions according to the invention within such interaction. The same effect can be achieved without interactive video using tight choreography of the object and screen images and manual control. Interactive video simply provides a method of achieving better control and tighter timing, and thus provides more sophisticated and complex stage-screen interactions.

While the invention has been described utilizing video projection, synchronized film projectors may also be used in the apparatus and method of the invention.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A method of providing one or more selected visual illusion effects for live performances comprising:
    (a) providing an apparatus comprising:
        (i) a first projection screen having a front viewing side and being positioned in a first plane;
        (ii) a viewing area from which said first projection screen is visible to persons in an audience in said viewing area;
        (iii) a stage area between said viewing area and said first projection screen;
        (iv) an inclined, partially silvered mirror between said viewing area and said stage area, said mirror being inclined upward away from the viewing area;
        (v) a movable second projection screen lying in a second plane at an angle to said first plane, wherein said inclined mirror is positioned between said planes and at equal angles to said first plane and said second plane;
        (vi) a rear projection means for projecting images on said first projection screen so that images on said first projection screen are visible to viewers in said audience in said viewing area;
        (vii) a second projection means for projecting images on said second projection screen so that images on said second projection screen are visible to said viewers by means of reflection from said mirror and appear to be located at a selected location; and
        (viii) a computerized switching means of changing between images from said projection means;
    (b) placing an object between said partially silvered mirror and said first screen;
    (c) utilizing said projection means and said movable second projection screen to create a visual illusion wherein when images from said second projection means are reflected from said mirror so that said selected location is (i) in said first plane, said images are indistinguishable to said persons from images being projected directly on said first projection screen, (ii) in front of said first plane, said images appear to said persons to have moved closer to said audience than said first plane, and (iii) behind said first plane, said images appear to have moved farther from said audience than said first plane; and
    (d) providing a character in a production utilizing said apparatus with a position sensor device to coordinate selected projected images with movement of said character.

2. The method according to claim 1, further comprising linking said position sensor device with graphic illustration means which are visible on at least one of said projection screens.

3. The method according to claim 2, wherein said graphic illustration means results in an animated image which appears to said viewers to be on a plane in space between said first plane and the viewing area.

4. A method of achieving visual merger of stage and screen images, comprising:

(a) providing a viewing area for positioning viewers in an audience to view a live stage production, a stage area and a rear projection screen visible from said viewing area, a second projection screen not visible from said viewing area, stage lighting means, a partially silvered mirror between said viewing area and said projection screen, a rear projection means for projecting an image on said rear projection screen and a second projection means for projecting an image on said second projection screen so that the image is reflected from said mirror, wherein viewers in said viewing area cannot tell whether images being viewed are being reflected on said mirror or being projected on said rear projection screen;

(b) providing moving picture images, which are visible to viewers in the viewing area, utilizing either of the projection means; and (c) providing a position sensor device, so that an object or person on the stage area appears to said viewers to change between being included among the moving picture images, being transparent to a chosen degree, being invisible, being on the stage separate from the moving picture images, and interacting with the moving picture images, through coordination of the degree of transparency of the object or person with the appearance and disappearance of images in the moving picture, by coordinated selective use of said projection means, said position sensor device, and said lighting means.

5. The method according to claim 4, wherein the rear projection means is utilized to provide the moving picture images.

6. The method according to claim 4, further comprising moving said second projection screen resulting in a change in the apparent location of the plane of images on said second projection screen with respect to the plane of images on said rear projection screen.

7. A method of providing one or more selected visual illusion effects for live performances, comprising:

(a) providing an apparatus comprising:
(i) a first projection screen having a front viewing side and being positioned in a first plane;
(ii) a viewing area from which said first projection screen is visible to persons in an audience in said viewing area;
(iii) a stage area between said viewing area and said first projection screen;
(iv) an inclined, partially silvered mirror between said viewing area and said stage area, said mirror being inclined upward away from the viewing area;
(v) a movable second projection screen lying in a second plane at an angle to said first plane, wherein said inclined mirror is positioned between said planes and at equal angles to said first plane and said second plane;
(vi) a rear projection means for projecting images on said first projection screen so that images on said first projection screen are visible to viewers in said audience in said viewing area;
(vii) a second projection means for projecting images on said second projection screen so that images on said second projection screen are visible to said viewers by means of reflection from said mirror and appear to be located at a selected location; and
(viii) a computerized switching means of changing between images from said projection means;

(b) placing an object between said partially silvered mirror and said first screen;

(c) utilizing said projection means and said movable second projection screen to create a visual illusion wherein when images from said second projection means are reflected from said mirror so that said selected location is (i) in said first plane, said images are indistinguishable to said persons from images being projected directly on said first projection screen, (ii) in front of said first plane, said images appear to said persons to have moved closer to said audience than said first plane, and (iii) behind said first plane, said images appear to have moved farther from said audience than said first plane; and (d) providing a position sensor, and utilizing said position sensor in coordination with said projection means and said moveable second projection screen.

* * * * *